May 15, 1956 H. O. KRON 2,745,294
VALVE CONTROLS

Filed Aug. 26, 1952 5 Sheets-Sheet 1

Fig. I.

Inventor
Harold O. Kron

By Arthur Middleton
Attorney

Fig. 2.

Inventor
Harold O. Kron
Arthur Middleton
Attorney

May 15, 1956 H. O. KRON 2,745,294
VALVE CONTROLS
Filed Aug. 26, 1952 5 Sheets-Sheet 3

Inventor
Harold O. Kron
Arthur Middleton
Attorney

May 15, 1956  H. O. KRON  2,745,294
VALVE CONTROLS
Filed Aug. 26, 1952  5 Sheets—Sheet 5

Motor-Operation

Fig. 9.

Hand Operation

INVENTOR
Harold O. Kron
BY
Arthur Middleton
ATTORNEY

United States Patent Office 2,745,294
Patented May 15, 1956

2,745,294

VALVE CONTROLS

Harold O. Kron, Philadelphia, Pa., assignor to Philadelphia Gear Works, Inc., Philadelphia, Pa., a corporation of Pennsylvania Application August 26, 1952, Serial No. 306,347

16 Claims. (Cl. 74—625)

The present invention relates to improvements in dual valve operators that may be electively either motor-driven or hand-operated and more particularly to manually-operable de-clutching of the valve-stem operating mechanisms for effecting hand operation of the valve-stem while simultaneously rendering inoperative the connection between the motor-drive and the valve-stem. An example of the type of control over which the present invention is an improvement is shown in the patent to Ball No. 2,114,013.

In Patent No. 2,114,013, there is elective operation of the valve-stem to open and close the valve, by motor-driven operation and by hand operation. When the motor-drive is in effect, hand operation is disconnected, and when hand operation is in effect, the motor-drive is disconnected. If, however, the motor-drive should be energized while the hand operation is in effect, that latter is immediately disconnected so the hand operator will not be injured. The motor-drive is normally connected at all times, so it is required that the operator manually disconnect the motor-drive by moving a lever before he can operate the valve-stem by hand.

It is among the objects of the present invention to improve upon the arrangement of that patent.

In the showing of that patent, the valve-stem is motor-operated by a rotatable valve-stem clutching worm-gear that has meshing with it a worm on a motor-driven shaft. When the valve-stem is to be hand-operated, the operator moves a lever to de-clutch the worm-gear from the valve-stem and clutch the hand-wheel to the valve-stem. So it is among the objects of this invention to re-arrange these parts so that the hand-wheel, when connected, drives through the worm-shaft rather than through the worm-gear, and does so with the hand-wheel, on a horizontal axis instead of a vertical one, thus making its movement more natural to an operator as well as making for a greater multiplication of the hand power at the point of its application to the valve-stem.

It is another object of this invention to arrange the assembly so that the clutch mechanism, whose reciprocation connects either the hand-wheel drive or the motor drive to the valve-stem, can encircle the worm-shaft rather than the valve-stem, so as to result in an extremely compact arrangement.

In the showing of that patent, when the parts are in hand-operating relationship, the clutch-operating yoke is locked in that position by means of two levers straddling the worm-shaft. These levers were pivoted at one end of each and their free extremities form a latch for the yoke. These levers were pivotally unlatched by means of a cam on the rotating worm-shaft coming into contact with the levers at their intermediate section. Another object of this invention is, therefore, to improve upon the arrangement of that patent by the redesign of these parts so that the levers can be made longer; that both move in the same direction instead of opposite directions; and that the yoke-contact is at the intermediate section of the levers while the unlatching force is applied at the free ends of the levers to take advantage of maximum leverage effect thereon.

Another object of this invention is to provide an improved yoke means for shifting the operation of the valve from motor-operation to hand-operation wherein the yoke means is substantially balanced so as to require a minimum of manual force to be applied thereto for effecting de-clutching and also for minimizing the spring size requirement for effecting return of the yoke means upon automatic release thereof to the clutching position, the spring thereby affording a minimum of resistance to manual de-clutching.

These objects, and possibly others, can be realized in a drive mechanism for a worm-gear operated valve-stem that is thereby opened and closed due to rotation of a shaft having a worm that co-acts with the worm-gear, with that worm-shaft normally rotated by a motor-drive having a reciprocable clutch member between it and the worm-shaft but which can be de-clutched by a hand-operated lever that at the same time clutches to the worm-shaft a manually-operable hand-wheel on a shaft parallel to the worm-shaft. Re-starting of the motor-drive automatically de-clutches the hand-wheel from the worm-shaft and re-clutches the motor-drive with that shaft. The clutch member is slidably operated by a rockable yoke having a lateral extension adapted to be latched in hand-operable position by extension-engaging notches on the intermediate section of each of two spring-loaded free-ended levers hanging pendently both at one side of the worm-shaft and adapted to be unlatched by pivotal movement thereof against the spring-load by contact with the free-ends of the levers one at a time in sequence by means rotated by the motor-drive. Spring-pressure effective on the yoke returns the hand-operated lever to initial latching position when the motor-drive is thus re-connected. Rotatable with the hand-wheel is a gear that has meshable and unmeshable with it a gear slidable on the worm-shaft and spring-pressed against the reciprocable clutch member so that movement of the clutch member toward the rotatable gear on the hand-wheel shaft brings about such meshing and return movement of the clutch member brings about such unmeshing. This same spring also spring-loads the clutch-operating yoke through the reciprocable clutch member against which the spring bears so that when the unmeshing takes place, the yoke and the hand-operated lever return to initial position.

A feature of this invention is the provision of an improved substantially balanced clutch-shifting yoke means in the mechanism for effecting clutching and de-clutching, the balance being provided by projecting portions on opposing sides of the yoke means, one of the projecting portions being adapted to be engaged for effecting pivoting of the yoke means, while the other of the projecting portions is adapted to be engaged by means for retaining the yoke means in its de-clutched position.

Still another feature of this invention is the provision of an improved releasable latching lever means for maintaining the rockable yoke means in its de-clutched position, wherein the latching lever means is pivotally mounted so as to have an intermediate portion thereof engageable with the rockable yoke means for retaining the yoke means in its de-clutched position and a free end portion thereof adapted to be engaged by automatic means for effecting pivoting of the lever means to a position releasing the yoke means from its clutching position.

Another feature of this invention is that the requirement for power transmitting elements of a thrust-imparting nature is substantially minimized, as is the number of power transmitting elements in the train between either the motor or the hand drive and the valve-stem. Resulting from this feature, the mechanism can be of simple arrangement and also mounted in its housing with a greater degree of accuracy as to the location of the bearings for the various shafts.

Another feature of this invention is that de-clutching can be effected by manual pivoting of a de-clutching lever which requires a minimum of force to be directed thereagainst as a result of the substantially balanced nature of the de-clutching yoke.

A further feature is that by having the pivotally mounted latching lever means disposed at one side of the axis of the worm-shaft, rather than in encircling relation thereto, with the intermediate portion of the latching lever means engageable with the yoke means for retaining the latter in its de-clutched position, and the lower free end portion thereof adapted to be automatically engaged by means carried by the worm-shaft upon actuation of the motor-drive, automatic clutching is effected with a minimum of resistance.

According to a preferred embodiment of the invention, it is adapted to be employed in a valve control including a motor-drive, a worm-gear whose rotation effects opening and closing movement of the valve stem, a shaft carrying a worm co-acting with the worm-gear, and for effecting rotation of the valve-stem, a train of power-transmitting elements between the motor-drive and the worm-gear having as one of its elements a clutch including a driving element and a reciprocable driven element respectively rotatably and non-rotatably carried by the worm shaft. In this embodiment, there is a hand-motivatable mechanism that includes a shaft parallel to the worm-shaft carrying a hand-wheel and a gear, while on the worm-shaft is a spring-loaded slidable gear mounted thereon for rotation therewith and for reciprocation with the driven reciprocable element of the clutch. The slidable gear on the worm-shaft is normally longitudinally displaced from the gear on the hand-wheel shaft and has associated with it rockable yoke means manually-operable to effect de-clutching to interrupt the motor-drive connection with the slidable gear on the worm-shaft and to effect axial movement of the slidable gear into operative engagement with the gear on the hand-wheel shaft for hand-operation of the valve. The rockable yoke means is of substantially balanced form so as to permit of facile operation thereof.

In further accordance with this embodiment of the invention, there is provided a means for latching the rockable yoke in its de-clutched position for hand-operation of the valve, which latching means is automatically releasable only upon actuation of the motor-drive. The latching means are pivoted levers hanging pendently at one side of the driving clutch element which has projecting means thereon adapted to engage the free ends of the latching levers upon motor-actuation of the worm-shaft to effect pivoting of the latter out of latching engagement with the rockable yoke.

Various other objects and advantages will become apparent from the detailed description to follow. The preferred embodiment of my invention is shown in the accompanying drawings, in which

Figure 8 is a vertical sectional partial but rather symbolic view of the reciprocable clutch member and its controlling yoke in motor-operating connection, while

Figure 1:
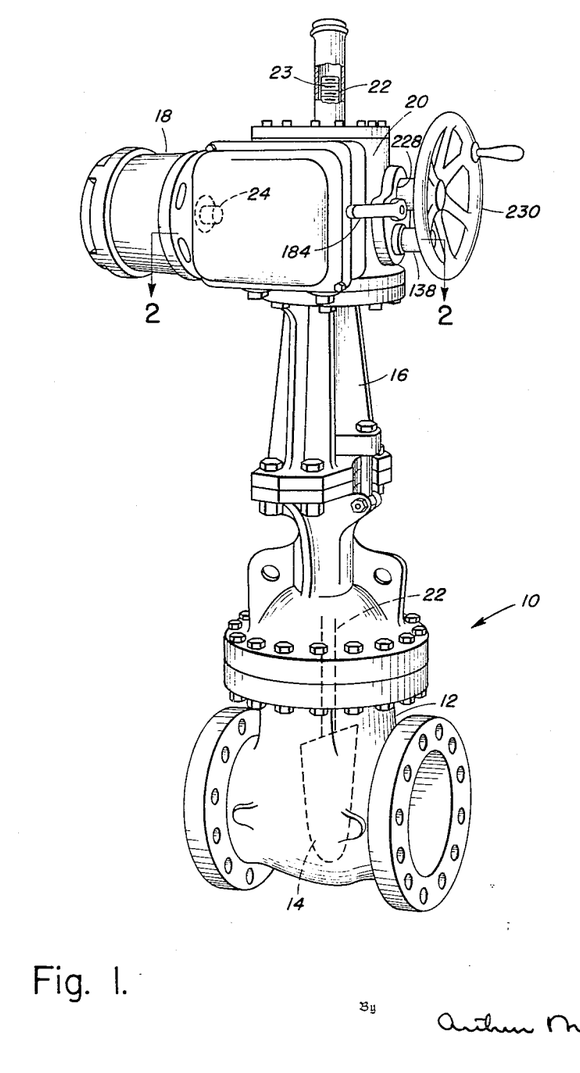
Figure 1 is a perspective view of the entire valve structure and control mechanism assembled.

It will be seen from Figure 1 that this invention is primarily adapted to be applied to a remotely controlled motor-driven valve such as is designated generally by the numeral 10. The valve 10 includes a casing 12, an opening and closing valve-head such, for example, as gate 14, a yoke 16 being mounted atop the valve casing 12 and adapted to support the motor-drive 18 which is attached to the casing 20 wherein is disposed the power transmitting train, for motor conection between the motor 18 and the valve-stem 22, and the manually operable de-clutching and valve-stem operating mechanism.

Figures 5, 6:
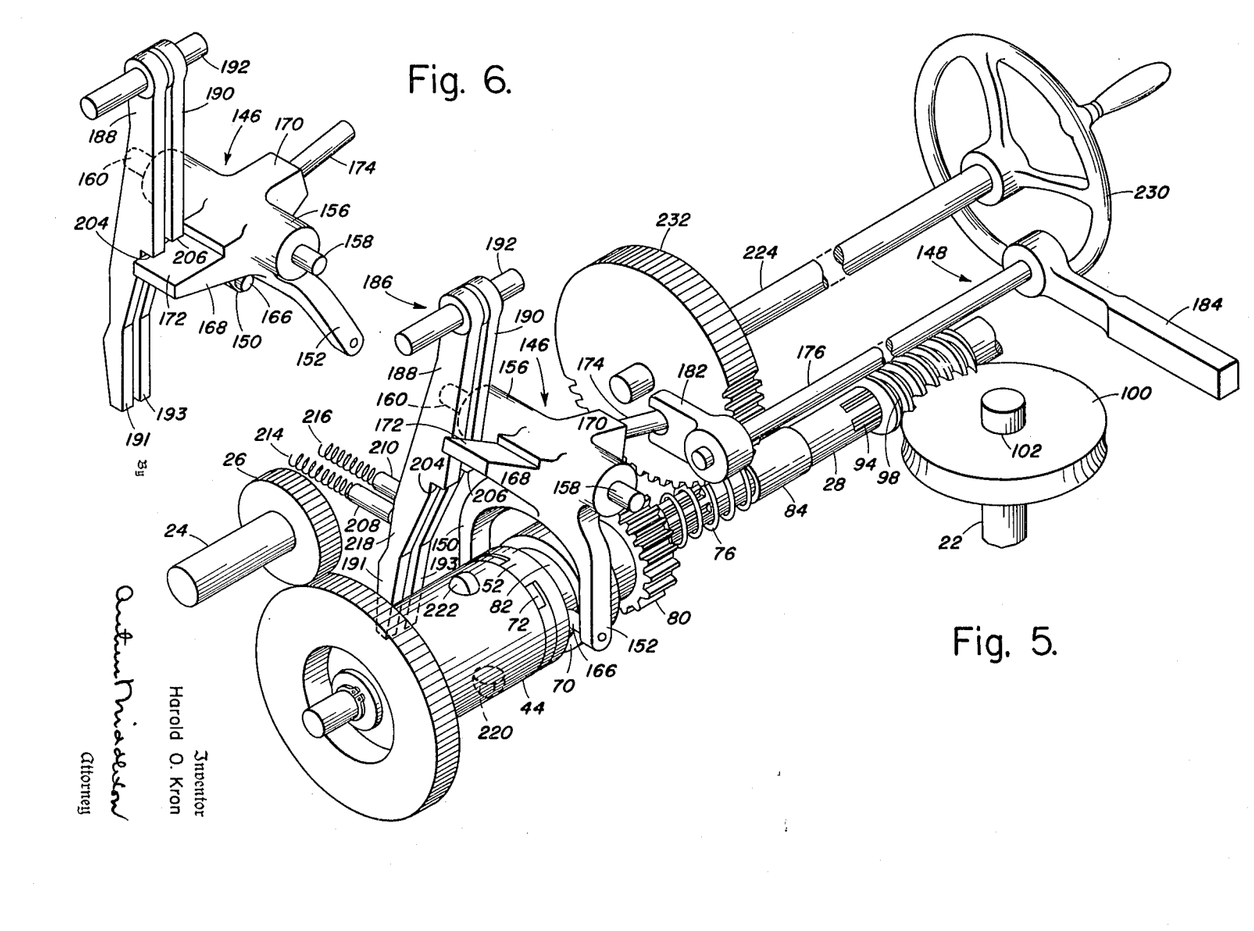
Figure 5 is an enlarged detailed perspective view of the manually operable de-clutching and valve-stem operating mechanism.
Figure 6 is a partial isometric view of the sequential unlatching of the pendent levers.
Figure 7:
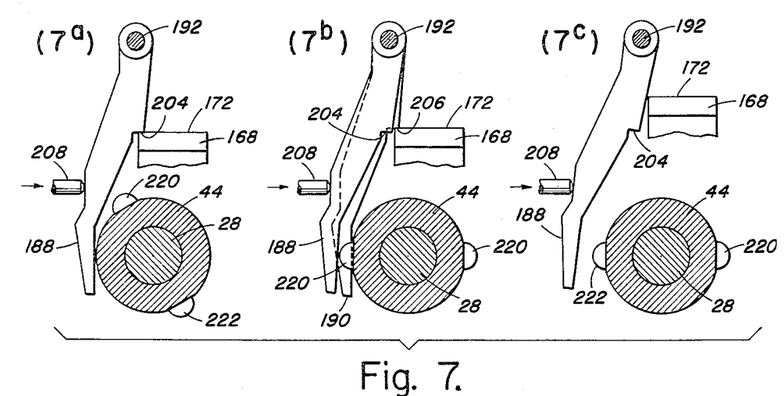
Figure 7 includes a series of vertical sectional views through the driving clutch element showing the projecting means thereon and the manner in which the projecting means successively engages the levers for pivoting the latter from their latching engagement with the rockable yoke.
Figure 8:
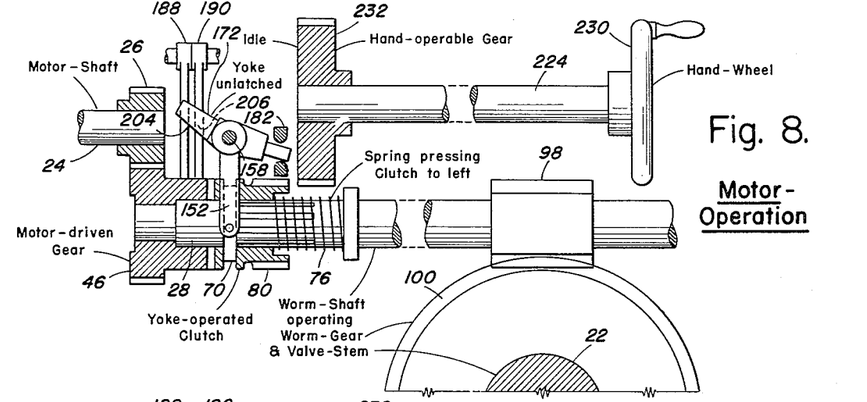
Figure 9:
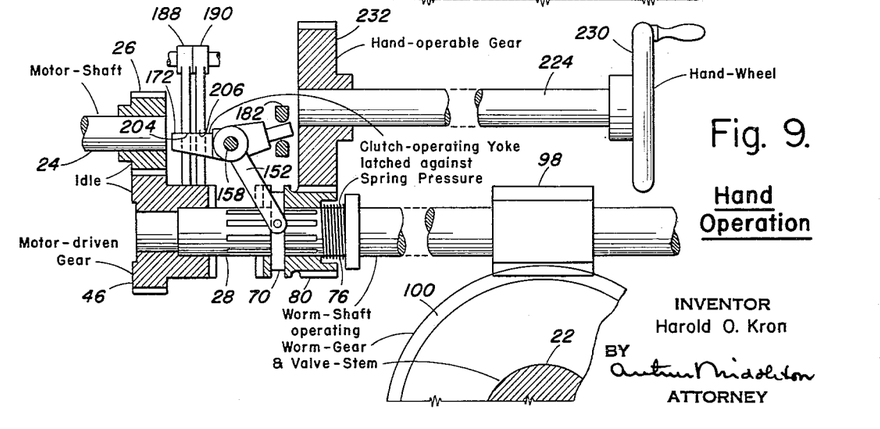
Figure 9 is a view similar to Figure 8 except that the parts are in hand-operating connection.

The motor operation of the valve-stem 22 and valve-gate 14 will now be described in detail, attention being drawn to Figures 2, 3 and 5. The shaft 24 of the motor 18 extends within the casing 20 and has its inner end provided with a pinion 26. A worm-gear carrying shaft 28 (hereinafter called the worm-shaft) has one end thereof with a reduced diameter portion 30 journaled for rotation in the bearing opening 32 of the apertured plate 34 separating the motor from the casing 20. The portion 30 of the shaft is formed with a groove at 36 in which is disposed a split ring 38, and a thrust washer 40 is positioned between the ring 38 and the plate 34 so that axial movement of the worm-shaft 28 in one direction is limited thereby. Between the shoulder 42 and the split ring 38 and rotatably carried by the worm-shaft 28 is a sleeve-like element 44 having composite functions which has a motor-driven gear 46 integrally formed therewith for operative engagement with the motor pinion 26 so as to effect rotation of the sleeve-like element 44. This element 44 has the face 50 formed with a plurality of lugs 52 providing a clutch-like face engageable by the reciprocable clutch element 70.

The worm-shaft 28 has an intermediate portion 48 thereof rotatably supported by the ball bearing 54, a locking ring 56 maintaining the inner race of the bearing in abutment with the shoulder 58. The outer race of the bearing is held relative to the partition wall 60 by means of the split ring 62 and the retaining plate 64 which is secured to the partition wall by the bolts 66. The portion 48 of the worm-shaft is formed with spline grooves 68 and a reciprocable driven clutch element 70 is non-rotatably carried thereby. The end face 72 of the clutch element 70, opposing the end face 50, is provided with a plurality of lugs 74 cooperable with the lugs 52. A spring 76 is interposed between the ring 56 and the driven clutch element at the recess 78 so as to normally retain the driven clutch element in operative engagement with the driving clutch element whereby actuation of the motor effects rotation of the worm-shaft. The clutch element 70 has a driven and slidable gear 80 unitarily secured thereto or integrally formed therewith and for a purpose to be described in detail hereinafter. The clutch element 70 is also formed with a peripheral groove or channel 82 the function of which will become apparent in the detailed description of the de-clutching mechanism.

The worm-shaft 28 has a spiral thread 84 formed on an adaptor base sleeve 86 secured thereto. A gear-type limit switch 88, such as is disclosed in the said patent to Ball, is geared to the sleeve 86 by the gear 90 (Figure 2), for limiting the power closing of the valve to a predetermined extent by breaking the circuit to the motor. The worm-shaft portion 92 has spline grooves 94 formed thereon and a worm sleeve 96 is reciprocably splined to the worm-shaft for rotation therewith. The sleeve 96 has external threading at 98 providing a worm for operative engagement with the worm-drive gear 100 which is horizontally disposed. The valve-stem 22 which is externally threaded at 23 is threadably engaged in the internally threaded bore of the bronze nut 102 which is mounted within the sleeve 103. The nut 102 and sleeve 103 are locked to the gear 100 so that rotation of the worm-shaft and worm-gear effects rotation of the worm drive gear and consequent vertical axial movement of the valve-stem and gate.

The sleeve 96 has an annular recess 104 in which the rock arm 106 of the torque responsive limit switch is engaged. A detailed disclosure of the torque responsive limit switch and its operation is made in the said patent to Ball. It will be understood, therefore, that upon full closure of the valve gate or encounter of an obstruction by the valve gate, the worm-sleeve will move axially actuating the switch to stop the motor-drive.

Reference is made to the said Ball patent for a complete description of the limit switches and their mode of operation when applied to valve operating assemblies. As pointed out in the Ball patent, when the valve reaches the end of either its opening or closing movement, a limit switch is operated to stop the motor drive and also to provide for reverse operation of the motor when it is next operated.

Figure 2:
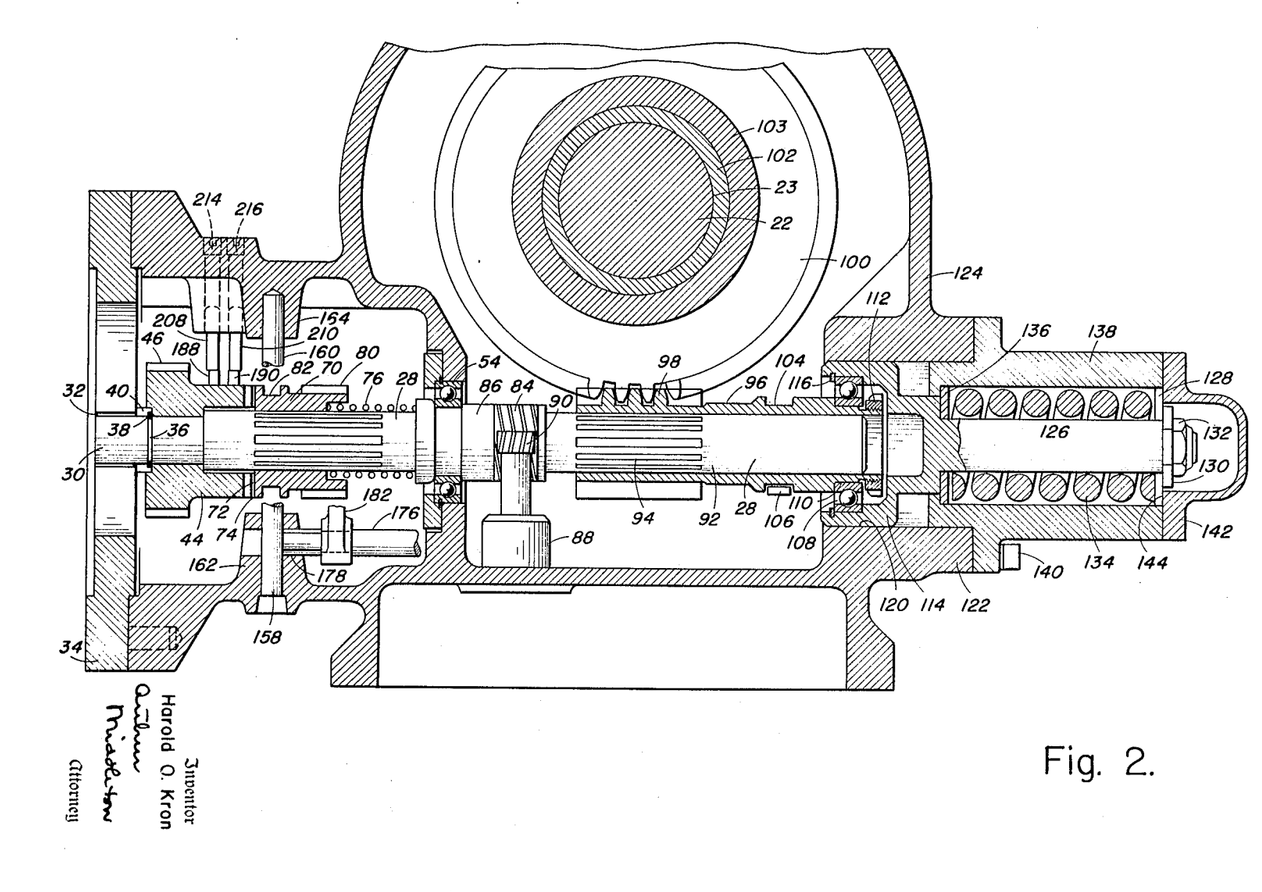
Figure 2 is a horizontal sectional view taken substantially along the plane of line 2—2 of Figure 1.
Figure 3:
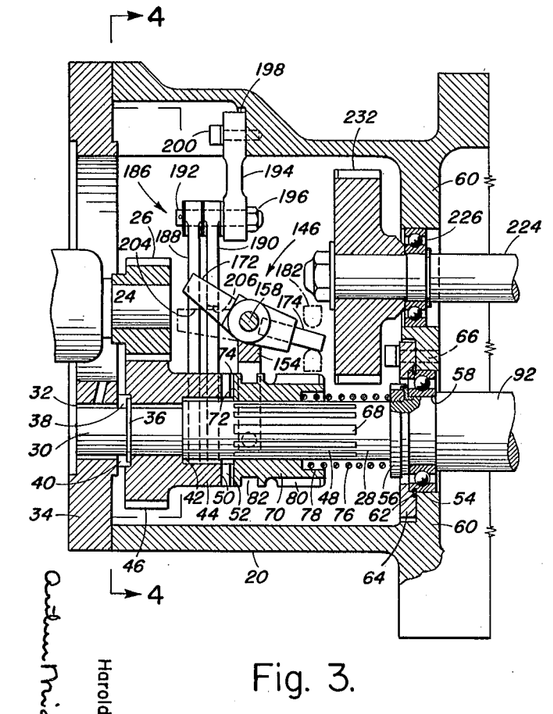
Figure 3 is a vertical longitudinal sectional view taken substantially along the plane of line 3—3 of Figure 4.

Figure 2 shows in detail the manner in which the worm-shaft is rotatably journalled and the worm-sleeve resiliently retained from axial movement. The inner race of the ball bearing 108 is engaged in the annular recess 110 and retained therein by the locking ring 112. The outer race of the bearing is mounted in the inner end of the bearing sleeve 114 and retained therein by means of the split retaining ring 116. The bearing sleeve 114 in turn is supported within the bore 120 in the boss 122 of the casing wall 124 and has a spindle portion 126 extending axially therefrom. A spring retaining ring 128 is mounted on the outer end of the spindle and a washer 130 and nut 132 retain the ring 128 from outward movement. A thrust spring 134 encircles the spindle 126 and abuts the washer 136 at the inner end and the retainer 128 at the outer end. An outer sleeve 138 co-axial with the spindle 126 is secured to the boss 122 by bolts 140 and the outer end of the sleeve 138 is closed by the cap 142 so as to seal off the interior of the casing. The cap 142 provides a shoulder at 144 which engages the retaining ring 128 so that outward movement of the spring is limited. It will thus be seen that outward movement of the worm-sleeve will effect resilient outward movement of the bearing sleeve and spindle in opposition to the spring 134, operation of the torque responsive limit switch effecting stopping of the motor and stopping of the outward movement in opposition to the spring 134.

Figure 4:
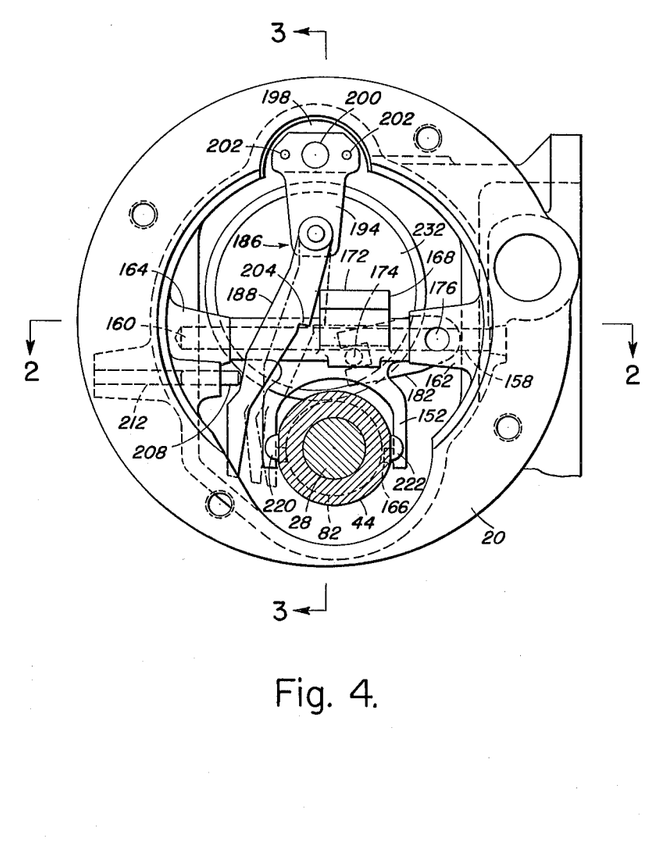
Figure 4 is a vertical transverse sectional view taken substantially along the plane of line 4—4 of Figure 3.

Looking now at Figures 3, 4 and 5, the details of the elective de-clutching and valve-stem operating mechanism will be described in detail. The de-clutching means includes a rockable yoke means designated generally by the numeral 146 and means 148 for operating the same. The yoke 146 is of substantially U-shape having a pair of legs 150 and 152 and a bight portion 154. Integral with the bight portion 154 and extending therefrom in co-planar relation to the legs is an elongated extension 156 having rock shafts or pins 158 and 160 extending axially therefrom. The rock shafts or pins 158 are rotatably journaled in the bosses 162 and 164 formed on the interior of the casing 20 so that the axis of pivoting for the yoke is above and in transverse relation to the axis of the worm-shaft. The lower or free ends of the legs 150 and 152 have pins or cylindrical protrusions 166 carried thereby and adapted to be engaged in the annular groove or channel 82. The bight portion of the rockable yoke has projecting portions or extensions 168 and 170 on opposite sides thereof. The extension 168 is formed with a flat surface at 172 for a yoke-locking purpose to be described in detail hereinafter. The extension 170 has a rocking pin 174 extending therefrom whereby upon upward movement thereof the yoke means will be rocked to a de-clutching position. It is to be noted that the construction of the yoke with the extensions is such as to provide an element substantially balanced about a vertical plane through the rock shafts.

The operator 148 for the yoke 146 includes a de-clutching shaft 176 journaled in the bearings 178 and parallel to the worm-shaft. The shaft 176 has a de-clutching fork or link 182 secured to the inner end thereof, the fork having a bifurcated portion for receiving the rocking pin 174. The outer end of the shaft 176 has a de-clutching lever 184 secured thereto exteriorly of the casing (see Figure 1) for hand operation. It will be seen that downward pivoting of the de-clutching lever effects upward pivoting of the fork 182 which rocks the yoke. The driven reciprocable clutch element is thereby moved out of operative relation with the driving clutch element in opposition to the spring 76.

The locking and unlocking means indicated generally by 186 for automatically releasably maintaining the mechanism in its de-clutching relationship includes a pair of spring-loaded flipper-like elongated latching levers 188 and 190 hanging pendently on one side of the worm-shaft and mounted for pivoting movement about the common pivot shaft 192 which is carried by the support link 194 (Figures 3 and 4) a nut 196 securing the shaft to the link. The link is secured at its upper end in a recess 198 formed in the upper part of the casing by the bolt 200 and pins 202. The levers 188 and 190 are formed with a notch-forming shoulder at 204 and 206 respectively, the shoulder 204 of the lever 188 being slightly below the plane of the shoulder 206. A pair of plungers 208 and 210 are disposed in the bores 212 (Figure 4) having springs 214 and 216 therein normally pressing respectively on the levers 188 and 190. The plungers 208 and 210 abut the flat portions 218 of each of the levers for normally urging them to a position engaging the flat face of the lug 172 extending laterally from the yoke 146 for retaining the yoke in motor-drive de-clutching position.

The sleeve-like element 44 (carrying motor-driven gear 46) on worm-shaft 28 has a pair of mounds, protuberances, or other projections 220 and 222 formed on its periphery for engagement with the free-ends 191 and 193 of levers 188 and 190 respectively for successive outward pivoting thereof upon actuation of the motor-drive to release the yoke and effect motor-driving of the worm-shaft. These protuberances extending radially from the periphery of the sleeve 44 (larger in diameter than the worm-shaft 28) in acting upon the free ends of the latching levers 188 and 190 exert significant arcuate movement on the levers as well as maximized leverage thereon to bring about easily and assuredly unlatching or unlocking of the yoke 146.

It is to be noted that in manual drive, the shoulder 204 of the lever 188, which is slightly lower than the shoulder 206 of the lever 190, is abutting the face 172 of the lug 168 against the pressure of the spring 76, while shoulder 206 is disposed in slightly spaced relation to the face 172. As soon as the power drive is switched on, the locking levers 188 and 190 are successively pushed back by the cams or projections 220 and 222, respectively, and held in retracted postion by the lug 168. If the first engagement to occur is between the cam 220 and lever 188, the lug 168 is still held down by the shoulder 206 until after 180° of rotation of the driven clutch element, at which time the cam 222 engages lever 190, retracting it and establishing power drive. If the first engagement to occur is between the cam 222 and the lever 190, the lever 190 will return to its original position after contact by the cam until the lever 188 has been retracted and the additional 180° of rotation has occurred. It is, therefore, immaterial, in the change from hand to power operation, which of the two cams 220 and 222 happens to be in position to push back its respective locking lever first. Furthermore, the construction of the levers and their relationship with the cams is such that the direction of rotation of the driven clutch element is immaterial.

For hand operation of the valve a hand-wheel shaft 224 is rotatably journaled in the casing in parallel relation to the worm and de-clutching shafts by the ball bearing 226 in the partition wall 60 and at 228. The outer end of the shaft 224 has a hand-wheel 230 secured thereto adjacent the de-clutching lever 184 and the inner end of the shaft carries a drive gear 232 secured thereto and normally axially displaced from the slidable gear 80 on the worm-shaft 28. Thus, upon de-clutching, the motor-drive connection with the worm-shaft 28 is rendered inoperative and the gear 80 is engaged with the gear 232 on the hand-wheel shaft so that hand operation of the valve can be performed.

Operation

Normally during the motor-operation of the valve control, the arrangement and relationship between the elements is as best shown in Figures 3, 5, 6 and 7. Upon actuation of the motor, the pinion 26 drives the gear 46 which in turn drives the driven clutch element. Since the driven reciprocable clutch element 70 is splined to the worm-shaft 28, the shaft rotates and the worm 98 thereon drives the worm-gear 100 through which the valve-stem extends whereby the valve-gate may be raised (opened) or lowered (closed) depending upon the direction of rotation of the motor.

If for any reason it is desired that the valve be hand-operated there is provided the means of this invention by which the motor-drive connection is rendered inoperative and a hand-drive connection perfected. The de-clutching lever 184 is first depressed and due to the balanced nature of the yoke 146 and the light spring 76 on the worm-shaft 28, the yoke is rocked from a clutching position in Figure 6 to a de-clutching position in Figure 7 with very little exertion. Furthermore, because of the relationship between the elements the chances of the operator coming to grief are minimized. The yoke will pivot to a position so that the driven clutch element is disengaged from the reciprocable driving clutch element 70 and the flat surface 172 of the yoke 146 will be engaged under the shoulders 204 and 206. The motor-drive through pinion 26 and gear 46 on the worm-shaft now will be inoperative and the gear 80 will be operatively engaged with the hand-operable driving gear 232 on the hand-wheel shaft 224. Hand operation of the valve then can be had by operating the hand-wheel. In order to have automatic motor-driving of the valve stem upon actuation of the motor and yet not have the hand operator come to grief, the mounds 220 and 222 are arranged to successively or sequentially engage the pendent offset latching levers 188 and 190 for outwardly moving them pivotally upon actuation of the motor to permit return of the yoke 146 and its clutch 70 to motor-drive clutching position, at the same time disconnecting the hand-drive from the worm-shaft 28. It will be realized that actuation of the motor during hand operation will not affect rotation of the worm-shaft until after disconnection of the hand-drive by the aforesaid automatically operable means since the reciprocable driving clutch element 70 and motor-driven gear 46 are otherwise rotatable freely on the worm-shaft 28.

In view of the foregoing, it is believed that an improved mechanism has been provided which will accomplish all of the objects hereinbefore set forth. It is to be understood that various mechanical modifications and substitutions can be made without departing from the real spirit and scope of my claimed invention, so long as equivalents used for the claimed elements are equivalent in their function as well as conjoint cooperation.

I claim:

1. In a valve control including, a valve-stem, a motor-drive, a worm-gear whose rotation effects opening and closing movement of the valve stem, a shaft carrying a worm co-acting with the worm-gear, a train of power-transmitting elements between the motor-drive and the gear having as one of its elements a clutch including a driving element and a reciprocable driven element respectively rotatably and non-rotatably carried by the worm-shaft, a hand motivatable mechanism including a shaft parallel to the worm-shaft carrying a hand-wheel and a gear, a gear slidably mounted on the worm-shaft for rotation therewith and for reciprocation with the reciprocable clutch element, spring means normally urging the slidable gear and the reciprocable clutch element to a clutching position longitudinally displaced from the gear on the hand-wheel shaft, rockable yoke means manually operable to effect de-clutching to interrupt the motor-drive connection with the worm-shaft and to effect axial movement of the slidable gear on the worm-shaft into operative engagement with the gear on the hand-wheel shaft for hand-operation of the valve stem.

2. In a valve control including, a valve-stem, a motor-drive, a worm-gear whose rotation effects opening and closing movement of the valve-stem, a shaft carrying a worm co-acting with the worm-gear, a train of power-transmitting elements between the motor-drive and the worm-gear having as one of its elements a clutch including a driving element and a reciprocable driven element respectively rotatably and non-rotatably carried by the worm-shaft, a hand-operable mechanism including a shaft carrying a hand-wheel and a gear, a gear slidably mounted on the worm-shaft for rotation therewith and for reciprocation with the reciprocable element of the clutch, spring means normally urging the slidable gear and the reciprocable element of the clutch to a clutching position longitudinally displaced from the gear on the hand-wheel shaft, a clutch-shifting yoke rockably mounted on a pivot axis transversely of the axis of the worm-shaft and engageable with the reciprocable element of the clutch for effecting axial shifting of that element and the slidable gear on the worm-shaft from a first position wherein the motor-drive is interconnected with the worm-shaft to a second position wherein the reciprocable clutch element is disengaged from the driving clutch element and the slidable gear is engaged with the gear of the hand-wheel shaft for hand-operation of the valve stem.

3. In a valve control including, a valve-stem, a motor-drive, a worm-gear whose rotation effects opening and closing movement of the valve-stem, a shaft carrying a worm co-acting with the worm-gear, a train of power transmitting elements between the motor-drive and the worm-gear having as one of its elements a clutch including a driving element and a reciprocable driven element respectively rotatably and non-rotatably carried by the worm-shaft, a hand-operable mechanism including a shaft carrying a hand-wheel and a gear, a gear slidably mounted on the worm-shaft for rotation therewith and for reciprocation with the reciprocable element of the clutch, spring means normally urging the slidable gear and the reciprocable element of the clutch to a clutching position longitudinally displaced from the gear on the hand-wheel shaft, a clutch-shifting yoke rockably mounted on a pivot axis transversely of the axis of the worm-shaft and engageable with the reciprocable element of the clutch for effecting axial shifting of that element and the slidable gear on the worm-shaft from a first position wherein the motor-drive is drivingly interconnected with the worm-shaft to a second position wherein the reciprocable clutch element is disengaged from the driving element and engaged with the gear on the hand-wheel shaft for hand-operation of the valve-stem, and means for effecting rocking of the clutch-shifting yoke.

4. The mechanism according to claim 3 wherein said last named means includes a de-clutching shaft parallelly related to the hand-wheel shaft, a lever on said de-clutching shaft adjacent the hand-wheel for effecting oscillation of the de-clutching shaft, a rocking pin projecting from the clutch-shifting yoke at one side of its pivot axis, and a de-clutching fork carried by the de-clutching shaft and engaged with said rocking pin for rocking the clutch-shifting yoke so as to position the reciprocable clutch element and the slidable gear on the worm-shaft in said second position.

5. The mechanism according to claim 4 and additionally including means for releasably retaining the clutch-shifting yoke in its de-clutching position until actuation of the motor-drive.

6. The mechanism according to claim 5 wherein said last recited means includes a pair of latching levers with shoulders formed thereon and pivotally mounted about a common pivot axis parallel to the axis of the worm-shaft, said clutch-yoke having a projecting portion engageable with said shoulders for retention thereby so as to maintain the yoke in its de-clutching position, and automatic means for successively effecting pivoting of said latching levers upon actuation of the motor-drive to successively disengage said shoulders of the latching levers from said projecting portion of the yoke so as to permit return of the yoke to its clutching position.

7. The mechanism according to claim 6 wherein said automatic means includes a pair of circumferentially and longitudinally spaced protuberances formed on the driving clutch element of the clutch and successively engageable with the latching levers upon actuation of the motor-drive.

8. The mechanism according to claim 7 wherein said spring means includes a spring coiled about the worm-shaft and engaging the reciprocable clutch element for normally urging the latter into engagement with the driving clutch element for motor-operation of the valve-stem.

9. In a valve control including, a valve stem, a motor drive, a worm-gear whose rotation effects opening and closing movement of the valve stem, a shaft carrying a worm co-acting with the worm-gear, a train of power transmitting elements between the motor-drive and the worm-gear having as one of its elements a clutch including a driving element and a reciprocable driven element respectively rotatably and non-rotatably carried by the worm-shaft, a hand-operable mechanism including a shaft having fixed thereon a hand-wheel and a gear, a gear slidably mounted on the worm-shaft for rotation therewith and for reciprocation with the reciprocable element of the clutch, spring means normally urging the slidable gear and the reciprocable element of the clutch to a clutching position longitudinally displaced from the gear on the hand-wheel shaft, rockable yoke means substantially balanced about a vertical plane through the axis thereof and manually operable to effect de-clutching to interrupt the motor-drive connection with the worm-shaft and to effect axial movement of the slidable gear on the worm-shaft into operative engagement with the gear on the hand-wheel shaft for manual operation of the valve stem.

10. In a valve control including, a valve-stem, a motor drive, a worm-gear whose rotation effects opening and closing movement of the valve stem, a shaft carrying a worm coacting with the worm-gear, a train of power transmitting elements between the motor-drive and the worm-gear having as one of its elements a clutch including a driving element and a reciprocable driven element respectively rotatably and non-rotatably carried by the worm-shaft, a hand-operable mechanism including a shaft carrying a hand-wheel and a gear, a gear slidably mounted on the worm-shaft for rotation therewith and for reciprocation with the reciprocable element of the clutch, spring means normally urging the slidable gear and the reciprocable element of the clutch to a clutching position longitudinally displaced from the gear on the hand-wheel shaft, a clutch-shifting yoke rockably mounted on a pivot axis transversely of the axis of the worm-shaft and engageable with the reciprocable element of the clutch for effecting axial shifting of that element and the slidable gear on the worm-shaft from a first position wherein the motor-drive is drivingly interconnected with the worm-shaft to a second position wherein the reciprocable clutch element is disengaged from the driving clutch element and the slidable gear is engaged with the gear on the hand-wheel shaft for hand-operation of the valve stem, said yoke having a rocking pin extending from one side of the pivot axis thereof, means engageable with the rocking pin for effecting rocking of the yoke, and a projecting portion for the yoke on the opposite side of the pivot axis from the rocking pin substantially counterbalancing the rocking pin for thereby providing a yoke substantially balanced about a vertical plane through the pivot axis.

11. In a valve control including, a valve-stem, a motor-drive, a worm-gear whose rotation effects opening and closing movement of the valve-stem, a shaft carrying a worm co-acting with the worm-gear, a train of power transmitting elements between the motor-drive and the worm-gear having as one of its elements a clutch including a driving element and a reciprocable driven element respectively rotatably and non-rotatably carried by the worm-shaft, a hand-operable mechanism including a shaft parallel to the worm-shaft carrying a hand-wheel and a gear, a gear slidably mounted on the worm-shaft for rotation therewith and for reciprocation with the reciprocable element of the clutch, spring means normally urging the slidable gear and reciprocable element of the clutch to a clutching position longitudinally displaced from the gear on the hand-wheel shaft, rockable yoke means manually operable to effect de-clutching to interrupt the motor-drive connection with the worm-shaft and to effect axial movement of the slidable gear into operative engagement with the gear on the hand-wheel shaft for manual operation of the valve stem, and means for releasably retaining the rockable yoke means in its de-clutching position until actuation of the motor-drive.

12. The mechanism according to claim 11 wherein the last recited means includes a pair of latching levers both on one side of the worm-shaft while swingably carried about a common pivot axis parallel to the axis of the worm-shaft and provided with shoulders formed intermediately of the ends thereof engageable with the yoke means for retaining the same in its de-clutching position, and automatic means engageable with the free ends of the levers for successively effecting pivoting of the levers upon actuation of the motor-drive to successively disengage the shoulders of the latching levers from the yoke so as to permit return of the yoke to its clutching position.

13. In a valve having a worm-gear operated valve-stem for opening and closing the valve, a worm-carrying shaft with the worm co-acting with the worm-gear, a spring-loaded gear slidably mounted on said shaft for rotation therewith, a motor-driven gear on the shaft, a hand-operable gear on a shaft parallel to the worm-shaft, a reciprocable clutch member including a yoke-operator therefor between the motor-driven gear and the slidable gear for effecting the connection selectively with the worm-shaft of either the hand-operable gear through the meshing therewith of the slidable gear or the motor-driven gear, the clutch member being normally connected to the motor-driven gear by the spring-load on the slidable gear and through the slidable gear on the clutch member, means manually operable in one direction to move the yoke to disconnect the clutch member from the motor-driven gear as well as to move the slidable gear against its spring-load into mesh with the hand-operable gear, yoke-latching means for locking the yoke and its clutch member when in the latter position, and means operable upon motivation of the motor-driven gear for moving the latching means to yoke-unlocking position whereupon the spring-load on the clutch returns it to motor-drive position, the worm-shaft and its co-acting worm-gear being common to both motor-drive and hand-drive and the worm-shaft carrying elements of each drive selectively connected to its respective drive whereby both drives operate through the worm-shaft.

14. Apparatus according to claim 13, wherein the clutch member and the slidable gear are unitary.

15. In a valve having a worm-gear operated valve-stem for opening and closing the valve, a worm-carrying shaft with the worm co-acting with the worm-gear, a spring-loaded gear slidably mounted on said shaft for rotation therewith, a motor-driven gear on the shaft, a hand-operable gear on a shaft parallel to the worm-shaft, a reciprocable clutch member including a yoke-operator therefor between the motor-driven gear and the slidable gear for effecting the connection selectively with the worm-shaft of either the hand-operable gear through the meshing therewith of the slidable gear or the motor-driven gear, the clutch member being normally connected to the motor-driven gear by the spring-load on the slidable gear and through the slidable gear on the clutch member, a third shaft parallel to the others and manually-operable in one direction to move the yoke to disconnect the clutch member from the motor-driven gear as well as to move the slidable gear against its spring-load into mesh with the hand-operable gear, yoke-latching means for locking the yoke and its clutch member when in the latter position including two free-ended levers each having a yoke-engaging section intermediate its end with both levers pivoted and hanging pendently on one side of the worm-shaft, and means operable upon motivation of the motor-driven gear for moving the latching levers to yoke-unlatching position by maximizing leverage thereon outwardly of the worm-shaft by pressing on their free ends whereupon the spring-load on the clutch returns it to motor-drive position.

16. In a valve having a worm-gear operated valve-stem for opening and closing the valve, a worm-carrying shaft with the worm co-acting with the worm-gear, a motor-driven gear detachably held on the shaft, a hand-operable gear detachably held on the shaft, a spring-loaded reciprocable clutch element including a yoke-operator therefor between the motor-driven gear and the hand-operable gear for effecting the connection selectively with the worm-shaft of either the hand-operable gear or the motor-driven gear, the clutch member normally connecting the motor-driven gear with the worm-shaft due to the spring-loading, a third shaft parallel to the others and manually-operable in one direction to move the yoke to disconnect the clutch member from the motor-driven gear as well as to move the hand-operable gear against its spring-load, yoke-latching means for locking the yoke and its clutch member when in the latter position including two free-ended levers each having a yoke-engaging section intermediate its ends with both levers pivoted and hanging pendently on one side of the worm-shaft, and means operable upon motivation of the motor-drive for moving the latching levers to yoke-unlatching position by maximizing levers thereon outwardly of the worm-shaft by pressing on their free ends whereupon the spring-load on the clutch returns it to motor-drive position.

References Cited in the file of this patent

UNITED STATES PATENTS

| | | |
|---|---|---|
| 1,273,543 | Schumann | July 23, 1918 |
| 1,345,327 | Mason | June 29, 1920 |
| 2,324,571 | Fitz | July 20, 1943 |
| 2,387,215 | Fawkes | Oct. 16, 1945 |

FOREIGN PATENTS

| | | |
|---|---|---|
| 358,250 | Great Britain | Oct. 8, 1931 |